United States Patent [19]

Bolton et al.

[11] 4,273,159

[45] Jun. 16, 1981

[54] EARTH BORING APPARATUS WITH MULTIPLE WELDS

[75] Inventors: Jimmie B. Bolton, Conroe; Sam T. Crews, Houston, both of Tex.

[73] Assignee: Smith International, Inc., Newport Beach, Calif.

[21] Appl. No.: 887,005

[22] Filed: Mar. 16, 1978

[51] Int. Cl.³ .............................................. F16L 9/04
[52] U.S. Cl. .................................. 138/109; 138/142; 138/155; 175/325; 308/4 A; 428/685; 428/932
[58] Field of Search ............... 428/627, 681, 682, 683, 428/684, 685, 932; 308/4 A; 148/11.5 Q, 134–137, 143–146; 285/15, 45, 286; 175/320, 325; 138/142, 155, 171, 172, 109; 228/231, 226, 263 D, 165, 166; 219/76.1, 76.11, 76.12

[56] References Cited

U.S. PATENT DOCUMENTS

| | | | |
|---|---|---|---|
| 2,334,350 | 11/1943 | Neuhaus | 308/4 A |
| 2,525,531 | 10/1950 | Scherer | 428/683 |
| 2,664,272 | 12/1953 | Boice | 255/28 |
| 2,850,044 | 9/1958 | Kilhlgren | 138/142 |
| 2,963,129 | 12/1960 | Eberle | 428/683 |
| 3,054,647 | 9/1962 | Von Rosenberg | 308/4 |
| 3,067,593 | 12/1962 | McCool | 64/1 |
| 3,074,767 | 1/1963 | Von Rosenberg | 308/4 |
| 3,725,016 | 4/1973 | Mal et al. | 428/683 |
| 3,754,609 | 8/1973 | Garrett | 175/323 |
| 4,087,593 | 5/1978 | Phelps et al. | 428/683 |
| 4,151,018 | 4/1979 | Bolton | 148/127 |

FOREIGN PATENT DOCUMENTS 2551895 5/1976 Fed. Rep. of Germany ........ 219/76.11

OTHER PUBLICATIONS

Translation of Offlegungsschrift No. 2551895 by Berlitz.

Murphy, J., ed.; *Surface Preparation and Finishes For Metals* McGraw Hill pp. 371–396, (1971).
*Composite Catalog, vol. 2* World Oil, Houston Texas, pp. 3216–3219.
*Composite Catalog vol 3;* World Oil, Houston Texas pp. 4694–4695.
*Metals Handbook vol. 6* 8th Edition, American Society for Metals pp. 273–276, (1971).
Oberg, E. et al.; *Machinery's Handbook* Industrial Press, N.Y. New York, 15th edition pp. 290–293, (1956).

*Primary Examiner*—Michael L. Lewis
*Attorney, Agent, or Firm*—Murray Robinson; Ned L. Conley; David Alan Rose

[57] ABSTRACT

A box tool joint member of generally tubular configuration is adapted for securement by welding to one end of a steel tube to form a drill pipe. The box tool joint member comprises a body having a cylindrical outer periphery, an internally threaded socket at one end of the body, and a weld neck of smaller outer diameter than the body adjacent to the other end of the body. A tapered transition piece connecting the neck with the adjacent end of the body provides an elevator shoulder. A correlative pin tool joint member is welded to the opposite end of the tube to complete the drill pipe.

The box tool joint member has an annular band of hard facing over the outer periphery of the transition piece and extending down over the adjacent part of the weld neck and up around the adjacent part of the body. The hard facing is corrosion resistant and has a smooth finished surface. Underneath the hard facing and extending beyond both ends of the hard facing is an annular butter layer of non-hardenable steel. The tool joint member is hardened and tempered after the butter layer is welded into a body groove and before the hard facing is welded on. The butter layer is grooved before the hard facing is welded on.

18 Claims, 6 Drawing Figures

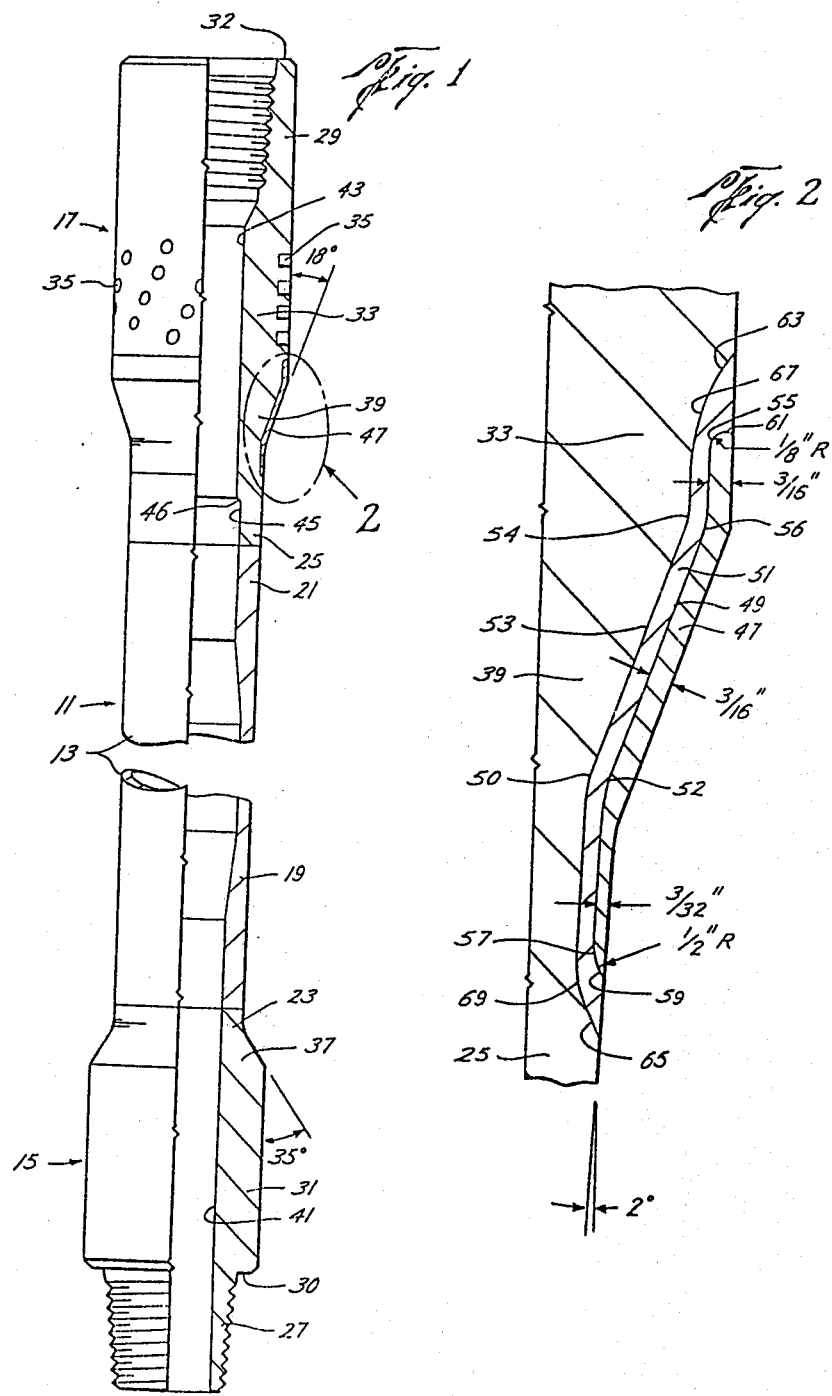

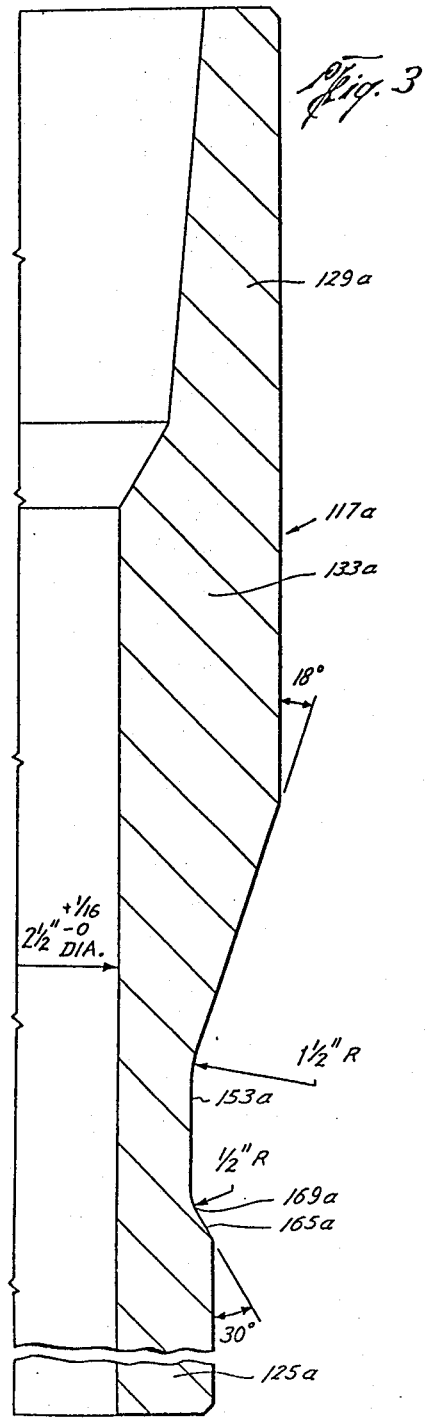
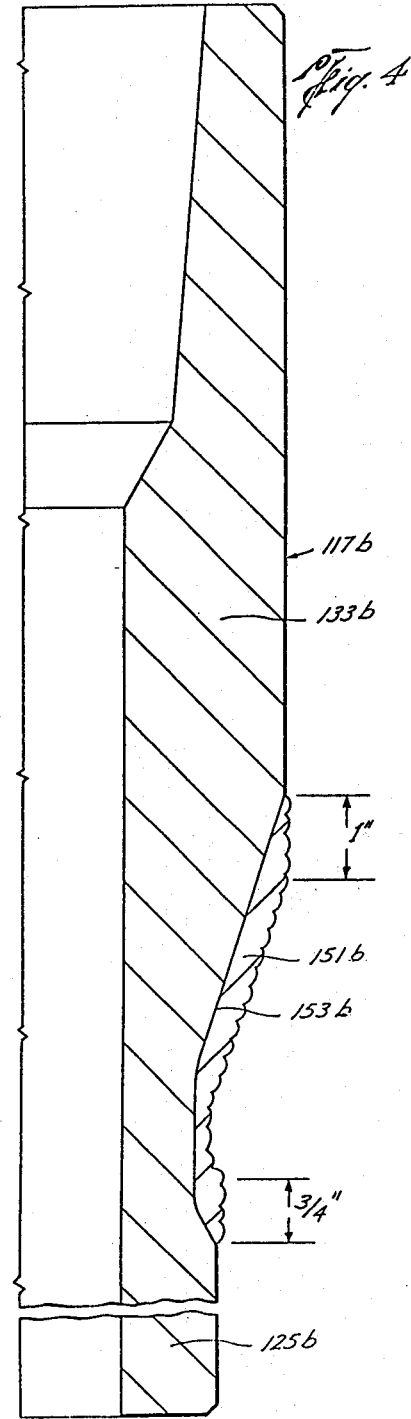

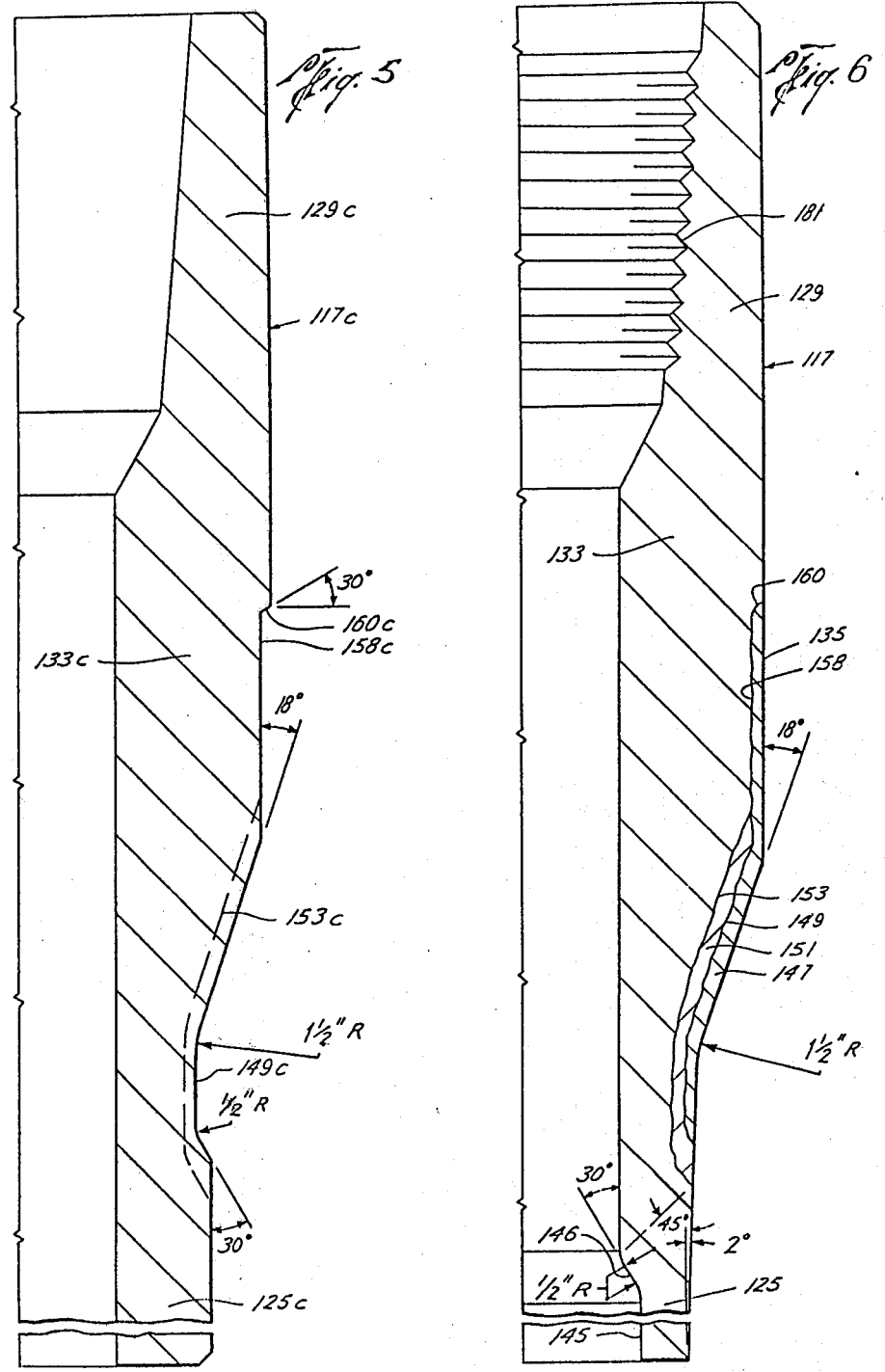

EARTH BORING APPARATUS WITH MULTIPLE WELDS

BACKGROUND OF THE INVENTION (a) Field of Invention

This invention relates to drill pipe used in earth boring wherein fluid is circulated down the drill pipe and up the annulus between the pipe and well bore. More particularly the invention relates to protection of the box tool joint member at the upper end of each length of drill pipe by means of hard facing welded thereon, the resulting product being particularly suitable for air drilling, as in geothermal wells.

(b) Description of the Prior Art (i) Hard Faced Box Tool Joint Members

The composite Catalogue of Oilfield Equipment & Services, 1976/77 Edition, at pages 3216-19 and pages 4994-5 illustrates box tool joint members with tapered elevator shoulders and various configurations of hard facing, typically tungsten carbide, just above the shoulder and extending downwardly thereover to some extent. See also U.S. Pat. No. 3,067,593—McCool which shows hard facing over the upper part of the elevator shoulder and adjacent large diameter portion of a box tool joint connector.

The foregoing catalogue references are perhaps representative of the commercial phase of the prior art. The hard facing may be set into grooves with the outer surface of the hard facing flush with the adjacent parts of the tool joint member or with the hard facing slightly protuberant. The hard facing does not extend downwardly far enough to completely cover the elevator shoulder and it does not cover any part of the weld neck by which the tool joint member is connected by welding to a tube to make a drill pipe. Although the weld between tube and weld neck is heat treated to overcome the effects of the heat of welding on the weld metal and the metal adjacent to the weld, the tool joint is not heat treated adjacent to the hard metal after the hard metal is welded on. Since the hard facing is confined to thick portions of the tool joint member, there is no concern that the tool joint will be unduly affected by the heat of welding during application of the hard facing.

(ii) Heat Affected Zone

That is not to say however that welding does not adversely affect the steel which is welded, especially in the case of welding on hard facing. Hard facing, e.g. tungsten carbide, is usually applied by the MIG (metal-inert gas) process of electric welding. The electrode is made of the desired binding material, such as mild steel. The hard facing is in the form of a powder and is funneled to the weld area. The electrode and metal to be hard faced are heated by passing an electric arc between them to bring the surface of the metal to be hard faced to fusion temperature and to melt the metal of the electrode. The hard metal is deposited on and adhered to the metal to be hard faced. Since the arc temperature is of the order of several thousand degrees F., the metal to be hard faced may be heated well above the critical temperature. Since the tool joint member is made of alloy steel, subsequent cooling of the weld in the air effects an air quench and hardens the steel to the point of making it brittle. The temper effected in the steel of the joint member following its previous heat treatment is thus lost. Also, since the steel is heated well above the critical temperature, the metal in the heat affected zone has a large grain size. Finally, the uneven heating of the metal is apt to cause small cracks in the metal in the heat affected zone. It is only because the part of the tool joint member above the tapered shoulder is so much thicker than the drill pipe tube that the bad effects of welding on hard facing can be tolerated. This is in contrast to the weld between the weld neck and drill pipe tube which, even though the tube end is upset to give great thickness, is preferably reheated above the critical, quenched, and tempered. In this regard, see U.S. patent application Ser. No. 814,542 filed July 11, 1977, by Jimmie Brooks Bolton, now U.S. Pat. No. 4,181,845 assigned to the same assignee as the present application, and the prior art cited therein.

(iii) Geothermal Drilling & Box Tool Joint Members with Ablative Layer

In geothermal well drilling, air must be used at least as the final drilling fluid in order to avoid sealing off the steam bearing formation being drilled. To effect removal of detritus with air, especially at the several thousand foot depths of geothermal wells, rather high air velocity must be employed. High velocity, detritus bearing, air is very abrasive and causes the tool joint shoulder in the drill string to be rapidly eroded, especially in sharp formations. If steam is found, it mixes with the drilling fluid and makes it even more destructive and corrosive. The usual tungsten carbide hard facing may do more harm than good; the roughness is believed to cause turbulence and consequently even more rapid erosion of the steel between the hard particles, resulting in even more roughness, erosion, and loss of the hard particles.

Efforts have been made to counter such wear by covering the entire tapered shoulder with an ablative layer of mild steel. As the ablative layer wears off, more mild steel is welded on, and this is done at frequent intervals. Both the initial layer and the replacement layers are applied in the field rather than at a factory. Plain box tool joint members having no hard facing on the elevator shoulder, only on the large diameter body portion of the box member, are used, because the usual tungsten carbide hard facing on the shoulder would initially be covered up by the ablative layer and would be of no value when the ablative layer wears off, as explained above.

(iv) Difficulties With Ablative Layer

Difficulty is experienced with a box tool joint member carrying an ablative layer. There is a heat affected zone in the base metal below the ablative layer as a result of the heat of the welding operation employed to apply the ablative layer. Since the ablative layer extends over the entire tapered shoulder into the fillet or round joining the shoulder with the weld neck, the heat affected zone extends into the weld neck. The weld neck is the thinnest part of the tool joint member and is subject to failure when the character of its metal is changed, as in the heat affected zone. Such failure may be caused by lowering of the fatigue resistance of the metal in the heat affected zone due to brittleness and increased grain size as previously explained.

Likelihood of failure is also increased due to stress concentration occasioned by difference in materials, the heat affected zone being harder and of different grain structure than the adjacent metal unaffected by heat.

A further source of difficulty with such ablative layer tool joint members lies in the fact that the ablative layer is protuberant. There results a shoulder at the lower end of the ablative layer. There is a stress concentration at the juncture of the shoulder and the weld neck. The weld neck is apt to fail at such juncture.

The shoulder at the lower end of the ablative layer also presents an obstruction to air flow. The resultant eddies cause a ring of erosion in the tool joint neck, just below the ablative layer, and undercutting of the tool joint underneath the lower end of the ablative layer. The tool joint is apt to fail at the eroded areas.

When the tool joint is reconstructed by welding on more ablative material, the ablative material (mild steel) gets into the eroded and undercut parts of the tool joint member causing stress concentration due to the difference in materials of the ablative steel, the base metal, and the heat affected base metal. Also, the heat affected zone adjacent the eroded portions of the tool joint member penetrates farther into the tool joint member, further weakening the member. In addition, the welder may accidentally nick the weld neck below the ablative layer, thereby creating a stress riser in the weld neck. The tool joint member may fail at any of these points of stress concentration or weakness. Finally, the tool joint member may crack during the welding operation or under stress in subsequent use; in the thinner section of the tool joint member at the weld neck the cracks may cause a complete failure, i.e. separation of the tool joint member.

SUMMARY OF THE INVENTION

According to the invention an annular groove is made around the outer periphery of a box tool joint member extending from below the tapered elevator shoulder in the weld neck part of the member to above the shoulder in the body of the member. The corners of the groove are wide angled or gently curved. A butter layer of steel that is soft, yielding and non-hardening, i.e. is permanently soft and ductile, e.g. a low carbon steel, is welded into the groove. The tool joint member is then heat treated, i.e. heated above the upper critical, quenched and tempered, to harden and temper the tool joint member. The heat treatment also creates the desired physical properties of the steel in the weld heat affected zone. Then the butter layer and adjacent metal are machined smooth to leave a new annular groove with wide angle or gently curving corners, and a macroscopically homogeneous, corrosion resistant, metallic, hard facing is welded to the butter layer, the hard facing being flush with the adjacent parts of the tool joint member. The member is then finish machined to be very smooth and slick.

Because the hard facing is flush with the adjacent parts of the tool joint member, there is no stress riser, there being no rapid change in section, and there is no shoulder to cause eddies and resultant erosion. Because the physical properties of the initial heat affected zone are restored to acceptable quality by heat treatment, and the butter layer insulates the tool joint member from the heat of application of the hard facing, and the butter layer itself is unaffected by heat, there is no weak, brittle, cracked, and easily fatigued metal likely to cause failure. Because of the butter layer, additional hard facing can be applied in the field without fear of creating an area likely to fail. Because the hard facing is machined smooth and is homogeneous the rate of erosion is reduced both initially and after use. Corrosion resistance enables the hard facing to stand up to the steam heated drilling fluid.

The wall thickness of the box tool joint member is increased just below the hard facing to strengthen the weld neck, since it may be accidentally weakened by a welder rebuilding the hard facing after the member has been worn down by use. The wall thickness of the member is also increased interiorly of the butter layer groove to compensate for reduction in strength due to the groove. To these ends the inner diameter of the box tool joint member is reduced, the reduction extending from the bottom of the threaded socket to a point in the weld neck about an inch beyond the butter layer groove. An internal shoulder is formed where the thick part of the weld neck joins the thinner portion at the end thereof.

The angle between the tool joint member axis and a line joining the small diameter end of the shoulder and the adjacent end of the groove in which is disposed the butter layer is about 45 degrees, e.g. 50 degrees or less, depending on the size of the tool joint member. This insures adequate strength and avoids stress concentration where the end part of the weld neck joins the grooved part thereof.

To compensate for the grooving of the weld neck and elevator shoulder and adjacent portion of the full diameter part of the tool joint member, the radius reduction of the inner periphery of the tool joint member, i.e., the radial extent of the shoulder, should be of the same order of magnitude as the depth of the groove receiving the butter layer, preferably being slightly larger so as to maintain at least the same area of cross section perpendicular to the axis of the member and preferably to provide at least about the same section modulus of such section about such axis as would exist if there were no groove in the exterior of the member and there were no reduction of the inner diameter of the member.

Description of Further Prior Art

Use of a butter layer in welding is not, broadly speaking, a new technique. See for example the description of methods of welding stainless steel to dissimilar metal, e.g. low carbon steel, described at pages 273–276 of Metals Handbook, 8th Edition, Volume 6, Welding and Brazing, copyright 1971 by the American Society for Metals. However in this case the butter pass or overlay of stainless steel initially applied to the low carbon steel is for the purpose of getting a start with the dissimilar weld metal (stainless steel) while there is little restraint on the weld metal. The butter pass, which is "machined or ground to desired dimensions and stress relieved, if required", is of the same material as the rest of the metal subsequently used to join the butter layer and the stainless steel member, i.e. stainless steel.

A further example is the known process of welding 4145 alloy steel tool joint members to stainless steel drill collars using a butter pass of mild steel applied to the alloy steel before the rest of the weld space is filled with stainless steel. However, this procedure is followed only because it permits preheating the alloy steel member prior to welding the butter pass, as is necessary to avoid cracking, and permits the stainless steel collar to be welded to the butter pass without preheating the stainless steel, it being undesirable to preheat the stainless steel because it would crack when welded.

In neither of the foregoing examples is the base metal quenched and tempered after the butter pass is welded on and before further metal is welded to the butter pass to dissipate the weld heat affected zone. In neither case is the metal welded to the butter pass a hard facing. *In neither case is the base metal or butter pass grooved. In neither case is there any replacement problem such as exists with hard facing.

Although martensitic stainless steel may be employed for hard facing, the stainless steel used in the foregoing example, wherein alloy steel tool joint members are stub welded to a stainless steel drill collar, is austenitic, which is relatively soft.

Restatement

Recapitulating, in the prior art construction of a box tool joint member with an ablative layer over the elevator shoulder, an external configuration stress riser was created initially at the juncture of the weld neck and the protuberant ablative layer on the elevator shoulder. A further external configuration stress riser occurred at the same location due to erosion at the lower end of the ablative layer. An internal metallurgical stress riser was created initially in the heat affected zone adjacent the welded-on ablative layer. This internal metallurgical stress riser was amplified when the tool joint member was reconstructed by welding on additional ablative material, since the ablative material penetrated the annular erosional groove in the tool joint member, causing the heat affected zone to penetrate deeper, and created a further internal metallurgical stress riser in that ablative material itself in the groove has different mechanical properties than the adjacent steel of the tool joint member.

By virtue of the present invention both external and internal stress risers at the juncture of the weld neck and elevator shoulder are eliminated, both initially and after rehard-facing. The invention eliminates any initial external configuration stress riser by placing the hard facing in a groove so it is flush with the adjacent surfaces of the tool joint member. Internal stress risers are eliminated by providing the groove with rounded corners, by placing a butter layer of soft unhardenable steel between the hard facing and the base metal at the bottom of the groove, by autenitizing, quenching, and tempering the box tool joint member after the butter layer is welded in place, and by machining the butter layer to provide a groove for the hard facing with the groove having rounded corners.

The rounded corners in the base metal groove and the butter layer groove coupled with the yieldability (self stress relieving) of the butter layer prevent stress risers from occurring at the groove corners. The heat treatment eliminates stress risers due to metallurgical difference at the heat affected zone when the butter layer is welded on. The butter layer is itself unaffected by the heat of welding on the hard facing and insulates the base metal underneath the butter layer from such heat. Upon rehard-facing no new stress risers are created since the only erosion is in the hard facing itself and when this is replaced the added hard facing will contact only the butter layer and the butter layer continues to insulate the base metal and is itself unaffected by the weld heat.

The butter layer extends downwardly along the exterior of the tool joint member a distance spanning the intersection of the elevator shoulder and the but slightly tapered nearly cylindrical outer surface of the weld neck part of the member. The butter layer extends upwardly toward the large diameter cylindrical body part of the tool joint member to a mechanically convenient stopping point where the wall thickness of the member is so great that a stress riser is immaterial.

Preferably the butter layer extends upwardly beyond the hard facing, e.g. into the large diameter cylindrical surface of the tool joint member, thereby avoiding a stress riser at the juncture of the end of the hard facing and the body of the tool joint. In such case, the butter layer preferably extends beyond the hard facing far enough so that the base metal is not influenced by the application of the hard facing metal.

It is to be noted that if the butter layer were omitted and the tool joint member heat treated after application of the hard facing rather than before, the hard facing could lose its hardness during the tempering step. In addition, the hard facing would not be field replaceable since heat treating would be unavailable in the field. In any event, the cushioning effect of the soft butter layer would be lost.

Description of Additional Prior Art

The subject invention is to be distinguished not only from previously known methods of protecting elevator shoulders on box tool joint members and from structural welding of dissimilar metals, as discussed above, but also from methods of attaching tungsten carbide hard facing to drill collars. Sometimes this has been done by welding tungsten carbide hard facing directly onto the outside of a drill collar, thus creating one or more protuberant bands of hard facing. This creates a weld heat affected zone under the bands, but due to the great wall thickness of a drill collar, the resulting product has been used, although it is not believed to be preferred.

Some users consider the protuberance of bands of tungsten carbide to be undesirable; for that reason some manufacturers machine an annular groove in the drill collar to receive the tungsten carbide band. Because the groove reduces the wall thickness, steps are taken to enhance the structure of the remaining material.

According to one process, after the band of tungsten carbide is welded into the groove the banded area of the drill collar is heated to a stress relieving temperature. It is to be noted however that the weld heat affected zone still remains, although its condition is somewhat improved.

According to another process, a layer of mild steel is welded into the groove, as level as possible, and then a tungsten carbide band is welded about the mild steel. The mild steel provides a tougher matrix for the tungsten carbide than is provided by the alloy steel of the drill collar, which is rather brittle after being brought up to welding temperature. However there is a weld heat affected zone in the drill collar where the mild steel is welded to the collar. This zone is to some extent stress relieved by the subsequent heat of welding on the tungsten carbide, but the heat affected zone remains. Also, to receive the layer of mild steel, the drill collar must be grooved deeper if the tungsten carbide is not to be protuberant.

In all of these processes, the drill collar is hardened before the hard facing is welded on, before any grooving of the drill collar, and before any mild steel is welded on, and the weld heat affected zone is not subsequently raised to austenitizing temperature to eliminate the zone. Grooving is for diameter control, and the use of a mild steel layer is to eliminate a brittle matrix produced by welding direct to alloy steel without subsequent heat treatment.

Another known method of hard facing drill collars is to weld a helical pass of mild steel over the outer periphery of the drill collar and then to weld a helical pass of tungsten carbide over the mild steel, centering the tungsten carbide pass in the helical valley formed between turns of the mild steel pass. The mild steel thus provides a recess to receive the tungsten carbide without the necessity of grooving the drill collar, and the mild steel provides a non-brittle matrix for the tungsten carbide and the heat of the tungsten carbide pass stress relieves the weld heat effected zone where the mild steel is welded to the drill collar outer periphery. However the weld heat affected zone is not eliminated and the resultant band of mild steel and tungsten carbide is protuberant. Final Summation Considering the foregoing, it will be seen that a feature of the present invention is the elimination of the weld heat affected zone by placement of a butter layer in between the hard facing and alloy steel drill collar and austenitizing the product after the butter layer is applied. A further feature is the use of such hard facing method to provide hard facing about an elevator shoulder of a box tool joint member.

Another feature is the provision on a box tool joint member of a band of smooth surfaced hard facing covering, over the elevator shoulder and extending beyond the shoulder over a portion of the weld neck, the hard facing being flush with adjacent parts of the box tool joint member. Finally may be mentioned the fact that the construction of the invention can be satisfactorily reconstructed in the field. Other features and advantages of the invention will become apparent from the following description of preferred embodiments of the invention and will be pointed out in the claims.

BRIEF DESCRIPTION OF THE DRAWINGS

For a detailed description of a preferred embodiment of the invention reference will now be made to the accompanying drawings wherein:

FIG. 1 is a half section of a length of drill pipe embodying the invention;

FIG. 2 is a fragmentary view showing a portion of FIG. 1 to a larger scale;

FIGS. 3, 4, 5, and 6 are fragmentary axial sectional views through a box tool joint member showing stages in the manufacture of such member embodying a modified form of the invention.

DESCRIPTION OF PREFERRED EMBODIMENTS

Referring now to FIG. 1 there is shown a length of drill pipe 11 comprising a tube 13 having a pin tool joint member 15 at its lower end and a box tool joint member 17 at its upper end. The tube has internally upset ends 19, 21 to facilitate welding the tool joint members onto the tube. The tool joint members are provided with weld necks 23, 25 whose outer diameters are the same as the outer diameters of the tube ends and whose inner peripheries, at least adjacent the tube ends, have inner diameters that are the same as the inner diameters of the tube portions.

Each tool joint member further includes a threaded connector ring; on the pin tool joint member there is an externally threaded ring or pin 27 and on the box tool joint member there is an internally threaded connector ring or socket 29. The threads on the connector rings are correlative, being adapted for make up with correlative rings to form tool joint connections.

When such connections are made, shoulder 30 on the pin tool joint member engages the shoulder formed by an end face or a correlative box tool joint member, such as shoulder 32 on member 17, so as to form a rotary shouldered connection. For a more detailed disclosure of such rotary shouldered connections see U.S. Pat. No. 3,754,609—Garrett.

Between externally threaded ring 27 and neck 23 on the pin tool joint member is a thick walled large diameter externally cylindrical body or tonging portion 31 adapted to receive one pair of tongs used in making up a tool joint connection. The other tongs are applied to the exterior of internally threaded socket or box ring 29 of an adjacent tool joint member. Between box ring 29 and weld neck 25 there is an externally cylindrical thick walled body or wear portion 33 provided with suitable wear resistant means to reduce the wear on the outer peripheries of the tool joint members where they contact the side of the hole being bored. By way of example such wear resistant means is chosen to comprise a plurality of tungsten carbide compacts 35 inserted and retained in holes in the outer periphery of wear portion 33.

Between tonging portion 31 and weld neck 23 of the pin tool joint member is an externally tapered transition section 37. Between wear portion 33 and weld neck 25 of the box tool joint member is an externally tapered transition section 39. Section 39, preferably tapered at 18 degrees, provides an elevator shoulder.

Pin tool joint member 15 has a cylindrical internal flow passage 41 of uniform diameter which equals the internal diameter of upset 19 at the lower end of tube 13. Box tool joint member 17 has a cylindrical internal flow passage 43 which is of slightly smaller diameter than the inner diameter of upset 21 at the upper end of the tube 13, except the lower end 45 of the passage is enlarged slightly to equal the diameter of tube upset 21. An internal rounded shoulder 46 joins the thinner lower end of the weld neck with the thicker wall upper part of the weld neck. It will be seen that the box tool joint member is thicker than previously known such members and is thicker than the pin tool joint member 15.

The elevator shoulder on the box tool joint member is protected against wear and erosion by a band of hard facing 47. Referring now to FIG. 2, the hard facing is set in an annular groove 49 formed in the outer periphery of butter layer 51. Butter layer 51 is in turn formed in annular groove 53 formed in the outer periphery of elevator shoulder 39. The extra thickness of the box tool joint member allows the exterior of the member to be grooved to receive the butter layer without undue loss of strength.

Both grooves follow the contour of the tool joint member from the weld neck over the elevator shoulder to the wear portion and the changes in contour of the grooves as they pass from weld neck to shoulder at 50, 52 and from shoulder to wear portion at 54, 56 are rounded. The upper and lower corners 55, 57 of groove 49 are rounded, and its lower side wall 59 is gently sloping outwardly while its upper side wall 61 is perpendicular to the axis of the tool joint member. This upper and lower side walls 63, 65 of groove 53 are gently sloping outwardly and the corners 67, 69 where the sides join the bottom of the groove are rounded.

As shown in the drawings, hard facing 47 extends beyond elevator shoulder 39 at both ends, extending downwardly into weld neck 25 and upwardly into wear portion 33, and butter layer 51 extends beyond the hard facing at both ends.

In manufacturing the drill pipe, the alloy steel forgings or tube sections from which the tool joint members are to be made are prepared and connected to the drill pipe tube according to the following sequence of steps.

A. Rough machine, i.e. turn the outside and inside to remove skin, but do not thread.

B. In the case of the box tool joint member, apply butter layer as follows:
  (1) machine annular groove to receive butter layer;
  (2) preheat the whole member to 600 deg. F.
  (3) Weld on butter layer, employing e.g. Lincoln L-70 welding wire (low carbon steel) and Lincoln 860 flux, using submerged arc process; the weld metal to extend radially above the sides of groove 53 for ¾ inch at lower end and one inch at upper end.

C. Heat treat whole tool joint member, as follows:
  (1) Heat to austenitizing temperature, e.g. 1500 deg. F.
  (2) Quench, e.g. with room temperature (72 deg. F.) water.
  (3) Temper by reheating, e.g. to 1050 deg. F., resulting in a hardness of 285-341 Brinell.

D. In the case of the box tool joint member, apply wear resistant materials to wear portion of tool joint member. In accordance with the FIG. 1 embodiment this involves drilling holes in the wear portion of the member and inserting compacts. See for example U.S. Pat. No. 3,054,647—Von Rosenberg. Compare U.S. Pat. No. 3,074,767—Von Rosenberg.

E. In the case of the box tool joint member, hard face the elevator shoulder and adjacent parts of the weld neck and wear portion of the member, as follows:
  (1) machine butter layer to form groove 49 and to level ends of butter layer with weld neck and wear portion of tool joint member.
  (2) Weld hard facing, e.g. an AISI 410 (or 420) stainless steel, into groove 49 in butter layer. For suitable materials and methods of hard facing and for information as to how to select material and method appropriate to particular usage, see pages 371-396 of Surface Preparation of Finishes for Metal published by McGraw Hill Book Company, copyright 1971.

F. Finish machine tool joint member including threads.

G. Attach tool joint members to tube, e.g. by friction welding as described in the aforementioned United States patent of Jimmie Brooks Bolton.

Referring now to FIGS. 3-6, there are shown several stages in the manufacture of a box tool joint member, as above described and with the preferred modification that the wear portion of the box is protected by an annular band of hard facing 135 in place of the tungsten carbide compacts shown in FIG. 1. Except for this one modification and as noted below, the embodiment of FIGS. 3-6 is the same as the FIG. 1 embodiment, and like parts are given like reference numbers plus 100 to avoid the need for repetition of the description. Also, different incomplete stages in the manufacturing process are distinguished by letters a, b, c.

Referring now to FIG. 3, there is shown a box tool joint member 117a in the condition following step B(1) described above. The tool joint member has been rough machined, and groove 153a to receive the butter layer has been machined. Note that in this embodiment of the invention, groove 153a does not extend up along the outer periphery of the wear portion of the member but instead terminates when it reaches the wear portion.

FIG. 4 shows member 117b after step B(3) described above. The member has been preheated and butter layer 151b has been welded on. The butter layer is thicker at this stage than later on after it is machined. It extends radially beyond the adjacent outer periphery of weld neck 125b over a distance of ¾ inch and beyond the outer periphery of wear portion 133b over a distance of one inch, so that there is plenty of material to allow the butter layer to be finish machined flush with the weld neck and wear portion.

FIG. 5 shows box tool joint member 117c in the condition after step E(1), the member having been heat treated and groove 149c in the butter layer having been machined but the hard facing not yet put in the groove. In this embodiment of the invention, groove 149c is continued up farther on wear portion 133c of the box tool joint member, as indicated at 158c, ending at tapered shoulder 160c. Groove extension 158c is provided to receive hard facing 135 (see FIG. 6) on the wear portion of the tool joint member, in lieu of the tungsten carbide inserts 35 of the FIG. 1 embodiment. No butter layer is provided under groove 158c since this is in the thick wall wear portion of the tool joint member which will not be unduly weakened by the presence of a heat affected zone under the hard facing. Also, the hard facing at 135 is not as subject to erosion as that over the elevator shoulder and need not be replaced as often, if at all, and hard facing 135 is not so subject to bending and flexing as is the hard facing at the juncture of the weld neck and elevator shoulder.

Referring now to FIG. 6, there is shown the finished box tool joint member 117 according to the presently most preferred embodiment of the invention. Box thread ring 129 has been internally taper threaded at 181. Weld neck 125 has been turned on its inner periphery at 145. Hard facing 147 and 135 has been welded into annular groove 149 and groove extension 135 (which is also annular), and the whole box tool joint member has been finish machined and is now ready for attachment to a drill pipe tube, e.g. as per the aforementioned Bolton application.

It will be noted that the angle between the axis of the tool joint member and a line joining the lower end of the groove receiving the butter layer and the smallest diameter part of internal shoulder 146 is forty-five degrees. Since FIG. 6 is a section, it will be apparent that such line is an element of a cone joining circles defined by the lower end of the groove and the upper end of the shoulder, as may be referred to in the claims appended hereto. The angle of such line may vary with tool joint members of different sizes but preferably should be near to 45 degrees, e.g. fifty degrees or less, to give the section adequate strength and avoid stress risers and still leave enough length of thinner walled weld neck for easy welding.

By way of illustration, it may be added that the drill pipe tube may be e.g. a seamless steel tube of A.P.I. grade E or better, the base metal of the tool joint member is a hardenable steel and may be made of AISI 4135-4137 (or 4140) alloy steel, the L-70 welding wire of the butter layer is a low carbon steel, e.g. an AWS-E 7018 electrode, which is nonhardenable, and hard facing 47, 147, 135 is preferably a metal that is not only hard but has a low coefficient of friction such as a stainless steel, e.g. AISI 410 (or 420), or a cobalt alloy, e.g. Stellite.

Low friction retards erosion by drilling fluids. By low friction is meant a material free of macroscopic hard particles (no crushed cast tungsten carbide particles) and having a smooth surface finish. Desirably the surface of the hard facing has a maximum r.m.s. roughness height of about 30 microinches, e.g. as can be achieved by turning on a lathe, and enhanced function is thought to be achievable by a polishing operation to achieve about 8 r.m.s. microinches maximum roughness height. For definition of r.m.s. roughness height see Machinery's Handbook, 15th edition, pages 290–293. By a hard metal is meant one having a Brinell hardness of at least about 400.

By a hardenable steel is meant one which can be heat treated to produce a hardness of at least 285 Brinell. By a non-hardenable steel is meant one which cannot by heat treatment alone have its hardness increased over 255 Brinnell.

While preferred embodiments of the invention have been shown and described, modifications thereof can be made by one skilled in the art without departing from the spirit of the invention.

We claim:

1. Drill pipe comprising a steel tube having a pin tool joint member welded to one end and a box tool joint member welded to the other end, said tool joint members each comprising a tubular body of hardenable steel, said body including a medial portion having a generally cylindrical outer periphery, a thread ring at one end of the body, a weld neck at the other end of the body, and a tapered shoulder between the neck and medial portion, the body of the box tool joint member having an annular groove thereabout extending over the shoulder and a portion of the weld neck adjacent to said shoulder, said box tool joint member further comprising a butter layer of non-hardenable steel welded into said annular groove, said butter layer having an annular groove thereabout extending over said shoulder and into said weld neck, said groove in said butter layer being filled with hard facing, said hard facing and the part of the butter layer beyond the ends of said groove therein being flush with the adjacent surfaces of the weld neck and medial portion of the body of the tool joint member, the steel of said butter layer being non-hardenable in the sense that by heat treatment alone the steel cannot have its hardness increased over 255 Brinnell.

2. Drill pipe according to claim 1, said bodies of said tool joint members having a Brinell hardness of at least 285, said butter layer having a hardness no greater than 250 Brinnell, said hard facing having a hardness of at least 400 Brinell.

3. Drill pipe according to claim 2, said hard facing having a maximum r.m.s. roughness height no greater than 8.

4. Drill pipe according to claim 3, said hard facing being Stellite (cobalt-chromium-tungsten non-ferrous alloy).

5. Drill pipe according to claim 4, said hard facing being macroscopically homogeneous.

6. For use in drill pipe comprising a steel tube having a pin tool joint member welded to one end and a box tool joint member welded to the other end, a box tool joint member comprising a tubular body of hardenable steel, said body including a medial portion having a generally cylindrical outer periphery, a thread ring at one end of the body, a weld neck at the other end of the body, and a tapered shoulder between the neck and medial portion, the body of the box tool joint member having an annular groove thereabout extending over the shoulder and a portion of the weld neck adjacent to said shoulder, said box tool joint member further comprising a butter layer of non-hardenable steel welded into said annular groove, said butter layer having an annular groove thereabout extending over said shoulder and into said weld neck, said groove in said butter layer beyond the ends of said groove therein being flush with the adjacent surfaces of the weld neck and medial portion of the body of the tool joint member, the steel of said butter layer being non-hardenable in the sense that by heat treatment alone the steel cannot have its hardness increased over 255 Brinnell.

7. Product according to claim 1 or 6, said body of said box tool joint member being free of all weld heat affected zones adjacent said butter layer.

8. Product according to claim 1 or 6, said box tool joint member including an annular externally tapered transition piece joining said neck of said box tool joint member to said medial portion of said body of said box tool joint member and providing said tapered shoulder, the inner peripheries of said body, transition piece and weld neck of said box tool joint member being of circular cross-section, and the part of said inner peripheries lying within said butter layer and extending therebeyond into said weld neck being of smaller diameter than the inner periphery of the end of the weld neck farthest from said transition piece.

9. Product according to claim 8, the inner periphery of said body and transition piece of said box tool joint member and the part of said weld neck of said box tool joint member adjacent to said transition piece of said box tool joint member being cylindrical and of a certain diameter and the inner periphery of the part of said weld neck of said box tool joint member farthest from said transition piece being cylindrical and of a larger diameter than said certain diameter, there being an internal shoulder on said box tool joint member joining said inner peripheries that have different diameters.

10. Product according to claim 9, a cone concentric with the axis of said box tool joint member passing through the circle defining the end of said groove nearest the smallest external diameter of said transition piece having cone elements lying at an angle of fifty degrees or less, to the cone axis.

11. Product according to claim 9, the section modulus of said transition piece (excluding said butter layer and hard facing) at each plane thereof perpendicular to the axis of the member being at least as great as the section modulus at the same plane of a like, except ungrooved, transition piece having an inner diameter equal to said larger inner diameter of said weld neck.

12. Product according to claim 9, the radial extent of said internal shoulder being of the same order of magnitude as the radial depth of said groove.

13. Drill pipe comprising a steel tube having a pin tool joint member welded to one end and a box tool joint member welded to the other end, said tool joint members each comprising a tubular body of hardenable steel, said body including a medial portion having a generally cylindrical outer periphery, a thread ring at one end of the body, a weld neck at the other end of the body, and a tapered shoulder between the neck and said medial portion, the body of the box tool joint member having an annular groove thereabout extending over the shoulder and a portion of the weld neck, adjacent to said shoulder, said box tool joint member further comprising a butter layer of non-hardenable steel welded into said annular groove, said butter layer having an annular groove thereabout extending over said shoulder and into said weld neck, said groove in said butter layer being filled with hard facing, the steel of said butter layer being non-hardenable in the sense that by heat treatment alone the steel cannot have its hardness increased over 255 Brinell, the inner periphery of said box tool joint member being of generally circular cross-section with the portion of said inner periphery that is located interiorly of the butter layer being of smaller diameter than the part of the inner periphery that is located at the end of the weld neck where it is welded to said tube.

14. Drill pipe according to claim 13 wherein said portion of the inner periphery of the box tool joint member which has said smaller diameter extends at least about one inch beyond the end of the butter layer toward said end of the weld neck.

15. Drill pipe according to claim 14, said inner periphery of the box tool joint member being generally cylindrical with a shoulder joining the larger diameter part of the inner periphery with the smaller diameter portion thereof, the latter portion extending to the bottom of the thread ring of the member.

16. Drill pipe according to claim 13, the inner peripheries of the medial and shoulder portions of the bodies of the tool joint members being generally cylindrical, the inner diameter of the last said portions of the box tool joint member, except for the part of the box tool joint member where it is welded to said tube, being smaller than the inner diameter of the last said portions of the pin tool joint member.

17. Drill pipe according to claim 13, the wall thickness of said medial portion of said box tool member being everywhere thicker than said medial portion of said pin tool joint member.

18. Drill pipe comprising a steel tube having a pin tool joint member welded to one end and a box tool joint member welded to the other end, said tool joint members each comprising a tubular body of hardenable steel, said body including a medial portion having a generally cylindrical outer periphery, a thread ring at one end of the body, a weld neck at the other end of the body, and a tapered shoulder between the neck and medial portion, the body of the box tool joint member having an annular groove thereabout extending around the shoulder, said box tool joint member further comprising a butter layer of non-hardenable steel welded into said annular groove, said butter layer having an annular groove thereabout extending around said shoulder, said groove in said butter layer being filled with hard facing, said non-hardenable steel being incapable of hardening to over 255 Brinell in response to heat treatment alone.

* * * * *

UNITED STATES PATENT AND TRADEMARK OFFICE
CERTIFICATE OF CORRECTION

PATENT NO. : 4,273,159
DATED : June 16, 1981
INVENTOR(S) : JIMMIE B. BOLTON & SAM T. CREWS It is certified that error appears in the above—identified patent and that said Letters Patent is hereby corrected as shown below:

Column 7, line 8: change this line to read: -protuberant.
FINAL SUMMATION-.

Column 8, line 54: change "This" to -The-.

Signed and Sealed this

Twentieth Day of April 1982

|SEAL|

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,273,159
DATED : 6-16-81
INVENTOR(S) : JIMMIE BROOKS BOLTON & SAM TRIBBLE CREWS

It is certified that error appears in the above—identified patent and that said Letters Patent is hereby corrected as shown below:

Column 7, line 4: change "heat effected" to -heat affected-

Signed and Sealed this

Thirty-first Day of August 1982

[SEAL]

Attest:

Attesting Officer

GERALD J. MOSSINGHOFF

Commissioner of Patents and Trademarks